Dec. 9, 1969    J. L. BREWSTER    3,483,379
AUTOMATIC X-RAY EXPOSURE CONTROL HAVING A DETECTOR WHOSE
RESPONSE IS CORRELATED WITH THE X-RAY ABSORPTION
PROPERTIES OF THE X-RAY FILM
Filed Nov. 24, 1967    2 Sheets-Sheet 1

JOHN L. BREWSTER
INVENTOR
BY
BUCKHORN, BLORE, KLARQUIST & SPARKMAN
ATTORNEYS

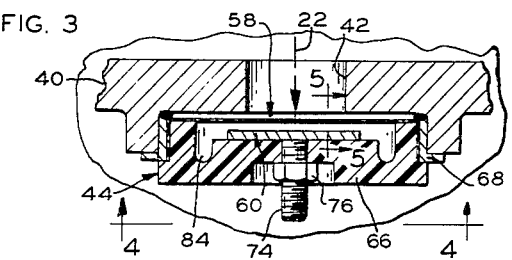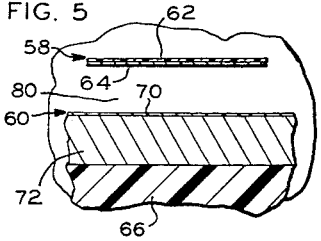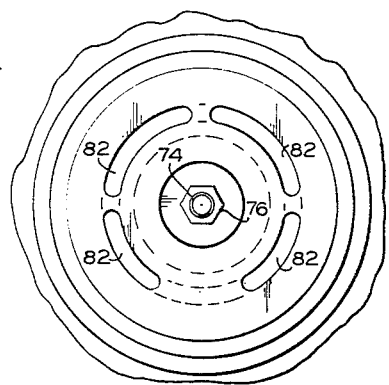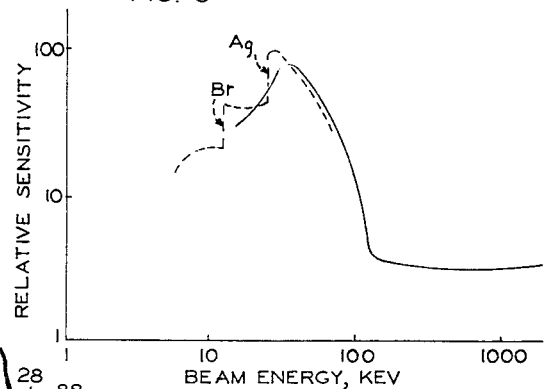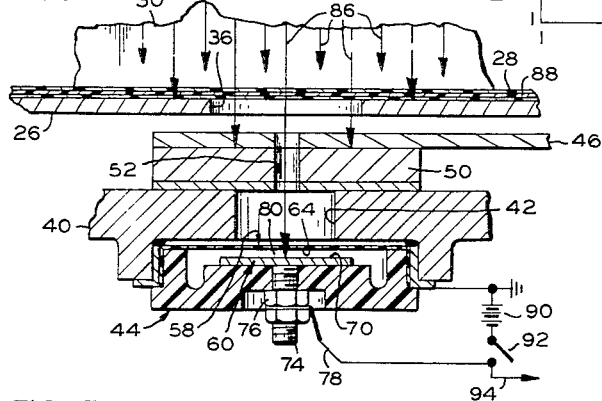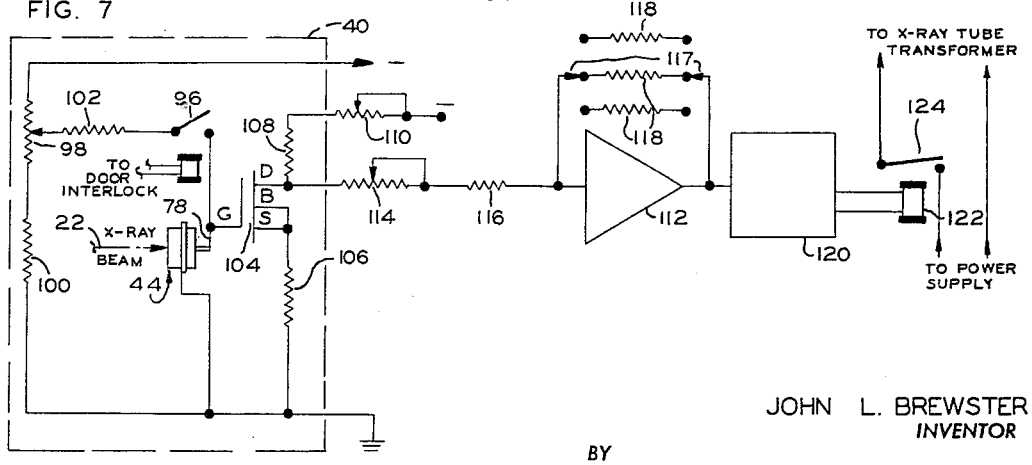

United States Patent Office 3,483,379
Patented Dec. 9, 1969

3,483,379
AUTOMATIC X-RAY EXPOSURE CONTROL
HAVING A DETECTOR WHOSE RESPONSE
IS CORRELATED WITH THE X-RAY AB-
SORPTION PROPERTIES OF THE X-RAY
FILM
John L. Brewster, McMinnville, Oreg., assignor to Field
Emission Corporation, McMinnville, Oreg., a corpora-
tion of Oregon
Filed Nov. 24, 1967, Ser. No. 685,604
Int. Cl. H05g 1/28
U.S. Cl. 250—95
16 Claims

ABSTRACT OF THE DISCLOSURE

An X-ray system includes an X-ray tube for exposing a photographic film upon which the object being X-rayed is located, and further includes an ionization chamber positioned on the remote side of the X-ray film from such object. The chamber is capacitively charged whereby X-radiation passing through both object and film is effective to produce ionization in the chamber, discharging the chamber's capacitance and automatically concluding the exposure. The ionization chamber electrodes are formed of material having an X-ray absorption spectrum including absorption edge discontinuities substantially corresponding to the absorption spectrum of the film whereby an accurate gauge of film exposure is achieved even at low X-ray beam energies. The chamber electrodes are also closely spaced in order to reduce the effect of beam energy on the correspondence between chamber and film characteristics.

BACKGROUND OF THE INVENTION

Several systems have been employed heretofore for providing automatic exposure of films, plates, or other photographic detection means used in radiography. For example, a fluorescent screen may be employed in conjunction with a photoelectric means wherein the fluorescent screen is exposed to X-radiation for producing a light output. The fluorescent screen illuminates photoelectric means while the latter is connected for gradually charging or discharging a capacitance in response to incident illumination. The charge at any one time is a measure of the radiation dose received, and when the charge reaches a predetermined value, the generation of X-rays is suitably discontinued by automatic circuitry.

A simpler and more reliable means for gauging X-radiation dose comprises an ionization chamber exposed to the X-radiation. The radiation produces ionization of a gas between chamber electrodes and resultant conduction therebetween. The chamber may be connected to charge or discharge the capacitor in the same manner as the aforementioned photoelectric means. Most ionization chambers employ air-equivalent electrodes whereby ionization in the chamber is substantially a true measure of the dose in Roentgens. However, the photographic detector or film does not necessarily respond in a direct manner to radiation dose, but rather the blackening of the film and the like depends upon complex factors.

Ionization chamber electrodes formed of materials having a higher atomic number than air-equivalent materials have heretofore been employed. For example, the device of Zieler Patent 2,953,702 employs electrode metals of higher atomic number such as iron or copper in order to achieve greater over-all ionization, and greater ionization in particular as the energy or hardness of the X-rays increases. The selection of ionization electrode materials on this basis is satisfactory for relatively high beam energies and low exposure times such as used in medical work. However, at the lower beam energies and longer exposure times frequently employed in industrial radiography, correct exposure is more difficult to achieve and frequently requires additional complex control of the X-ray tube voltage in order to produce a satisfactorily automatic result.

Moreover, it has heretofore been the usual practice to place the ionization chamber between the object being X-rayed and the photographic detector in order to avoid filtering by the photographic detector. Such filtering by the photographic detector would render automatic exposure control by an ionization chamber nearly impossible at low variable beam energies using presently available equipment. Unfortunately, placement of the ionization chamber between object and photographic detector spaces the object from the photographic detector to an extent causing image blur because the X-ray source has a finite size and because of secondary radiation scatter.

SUMMARY OF THE INVENTION

According to the present invention, an automatic X-ray exposure system includes an ionization chamber preferably located on the opposite side of both the object being X-rayed and the photographic detector, or film, from the source of X-radiation. Furthermore, an ionization chamber electrode, which is disposed in the path of such radiation, includes material exhibiting an absorption spectrum substantially corresponding to the absorption spectrum of the photographic detector or film. For example, such absorption spectrum of the ionization chamber electrode substantially corresponds to that of the photographic detector or film at the location of the absorption edge discontinuities in the spectrum of such photographic detector or film. Therefore, the ionization chamber reacts in substantially the same manner as the film, and more nearly correct exposure is achieved even at beam energies down to values in the vicinity of such absorption edge discontinuities, inasmuch as the chamber and film characteristics correspond in this range. Despite the location of the film between the X-ray source and the ionization chamber, producing absorption or filtering of the X-rays, the proper matching is still maintained by proper selection of the ionization chamber electrode materials. As a result, radiograph clarity is also improved.

Furthermore, in connection with the present invention, it is preferred that the spacing between the ionization chamber electrodes be such as to render the chamber substantially less sensitive to increases in X-ray beam energy. Thus, the electrodes of the ionization chamber are preferably very closely spaced so that photoelectrons produced at the ionization chamber electrodes at higher beam energies will not produce disproportionately greater ionization with resultant distortion in the response of the ionization chamber. Therefore, correlation between the response of the chamber and the photographic detector is maintained for a wide range of beam energies.

It is accordingly an object of the present invention to provide an improved X-ray system, having automatic exposure control, which is operative to produce proper exposure at various selected beam energies down to quite low values.

It is a further object of the present invention to provide an improved X-ray system, having automatic exposure control, wherein the response of exposure control means is correlated to a high degree with the response of the photographic detector or film employed.

It is a further object of the present invention to provide an improved substantially automatic exposure radiography while at the same time providing a high degree of contrast in the resultant radiographs.

It is a further object of the present invention to provide an improved X-ray system having automatic exposure control wherein blur or lack of clarity in the resultant radiographs is largely avoided.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 3 is a cross section of an ionization chamber in accordance with the present invention taken at 3—3 in FIG. 2;

FIG. 4 is a bottom view of the FIG. 3 ionization chamber taken at 4—4 in FIG. 3;

FIG. 5 is a cross-sectional detail of the FIG. 3 ionization chamber taken at 5—5 in FIG. 3;

FIG. 6 is a further cross section of the ionization chamber according to the present invention, as located in the FIG. 1 apparatus, in alignment with an object being X-rayed and photographic detection means;

FIG. 7 is a circuit in which the ionization chamber of FIGS. 3 and 6 is connected; and FIG. 8 is a graph of sensitivity vs. beam energy of a photographic detector or film means.

DETAILED DESCRIPTION

Figure 1:
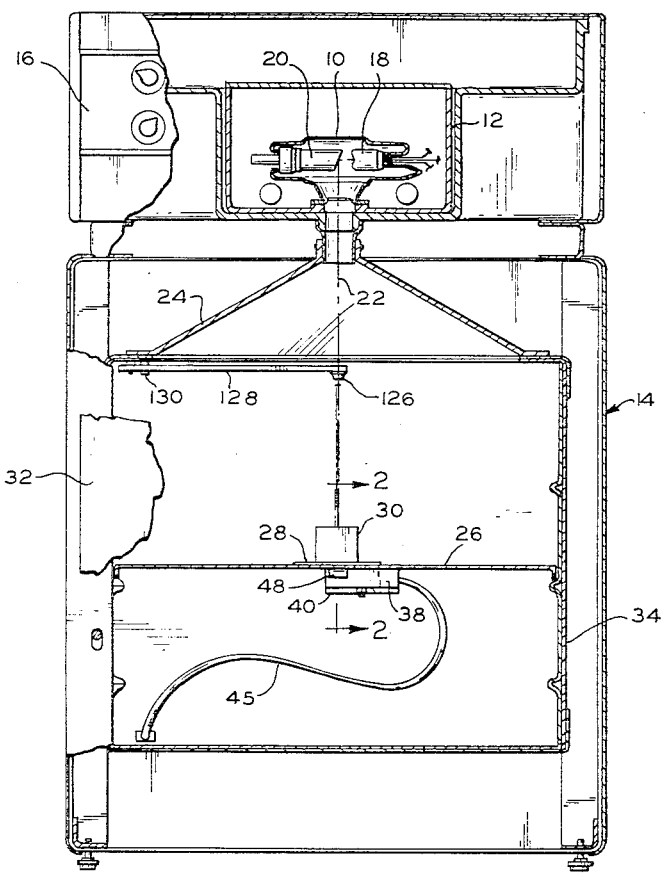
FIG. 1 is a cut-away front elevation of an X-ray system apparatus of the present invention.

Referring to FIG. 1, illustrating an apparatus embodying a system according to the present invention, X-ray generation means comprising X-ray tube 10 is housed within lead container 12 in the upper portion of a cabinet generally referred to at 14, behind a control panel 16 employed in operation of the apparatus. The potential in kilovolts provided between the cathode 18 and the anode 20 from a power supply (not shown) is adjustable in a well known manner within the range between approximately 15 and 110 kilovolts, the voltage being controlled from control panel 16. An X-ray beam having a center line at 22 is directed from the tube through lead shield funnel 24 towards a support shelf 26 which may be selectively placed at various levels within the lower portion of cabinet 14.

A film pack 28 may be placed upon the support shelf, and object 30 which is to be X-rayed may then be positioned directly upon the film pack. Such film pack suitably comprises conventional X-ray film provided with a photosensitive silver bromide emulsion, with the film being received within a thin light-opaque envelope. Although a film pack of this type is economically employed, it will be apparent that other types of photographic detectors such as photographic plates or films provided with some other silver halide emulsion or the like may be substituted therefor. Such photographic detector may thus suitably comprise any image-receiving means responsive to X-rays, with the economical film pack being preferred.

Both the photographic detector or film pack, and the object being X-rayed, are introduced into the cabinet by first opening door 32 which is suitably interlocked to prevent energization of X-ray tube 10 from the control panel when the door is open. The lower interior of cabinet 14 below funnel 24 is provided with lead shielding 34 therearound to substantially prevent exit of X-rays from the cabinet.

Figure 2:
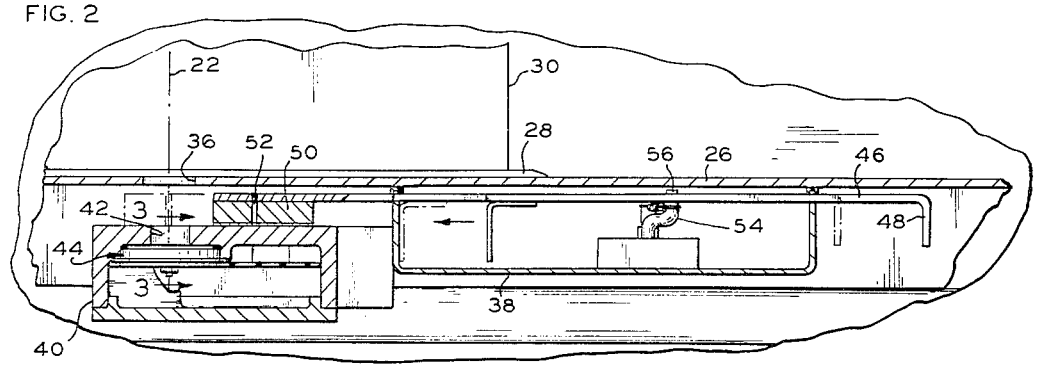
FIG. 2 is a cross-sectional detail of the FIG. 1 apparatus taken at 2—2 in FIG. 1.

Shelf 26 includes a central aperture 36 as illustrated in FIG. 2, aligned with the center line 22 of the X-ray beam. Bracket 38, secured to the underside of shelf 26, is joined to case 40 which the bracket positions immediately under aperture 36. Case 40 is similarly provided with an aperture 42 aligned with aperture 36, and immediately inside case 40 beneath aperture 42 is positioned ionization chamber 44. Ionization chamber 44 is therefore exposed to the X-ray beam after the beam passes through object 30 and film pack 28. Case 40 also includes circuitry to which the ionization chamber is connected, as well as dehumidification means (not shown). A cable 45 joins the aforementioned circuitry in case 40 to the remainder of the apparatus, such cable being flexible so that support shelf 26 may be positioned at different levels within the lower portion of the cabinet upon the guides provided.

Bracket 38 is slotted for sliding support of a slide 46 having a turned-down forward flange 48 extending forwardly from bracket 38, slide 46 being attached at its rearward end to a lead block 50 slidable across the top of case 40 in juxtaposition between apertures 36 and 42. Block 50 is also provided with an aperture 52 which aligns centrally with apertures 36 and 42, and the center line of X-ray beam when slide 46 is in its most rearward position. Aperture 52 is quite small, and limits the X-radiation which may reach ionization chamber 44 therebeneath. Slide 46 is employed as a means for adjusting the apparatus to different film speeds. Thus, when the slide positions aperture 52 in block 50 above ionization chamber 44, the chamber is rendered much less sensitive to X-radiation. The bracket 38 also supports an over-center spring pivot means 54 having a pin end 56 extending through a lateral slot in the upper portion of slide 46. This over-center spring pivot means acts as a toggle causing the slide 46 to assume one of two positions, either forward or rearward. When flange 48 is pulled forwardly, the means 54 holds the slide in a forwardmost position so that block 50 is entirely removed from the path of the X-ray beam passing through aperture 36. When the flange 48 is pushed inwardly, the means 54 holds the slide in a rearward position with aperture 52 aligned with the center of the X-ray beam path.

Referring more particularly to FIGS. 3, 4, 5, and 6, illustrating the ionization chamber 44 in greater detail, it is noted that the ionization chamber includes two spaced planar electrodes 58 and 60 disposed perpendicularly and in intersecting relation with center line 22 of the X-ray beam. The upper electrode 58 or the electrode nearest the X-ray tube suitably comprises a thin sheet 62 of insulating material or plastic such as Mylar having a conductive coating 64 disposed upon the bottom surface thereof. In one embodiment according to the present invention, the conductive coating 64 comprises a layer of silver just thick enough to be substantially optically opaque. This thickness essentially forms a window for the passage of the X-ray beam therethrough, and should be thin enough so that not more than half of a ten kiloelectron-volt beam is absorbed before reaching the region between electrodes 58 and 60. In a particular instance, a sheet 62 of insulating material compirses ½ mil thickness Mylar provided with an evaporated film or coating 64 of silver having a thickness on the order of a fraction of a micron, so as to be barely optically opaque. It is preferred that coating 64 be formed of a conductive metal having an atomic number approaching that of silver, as hereinafter more fully described, for matching the X-ray absorption spectrum of the photographic detector or film. However, it is also possible to employ some other conducting material, principally to provide a conductive return for the ionization chamber, e.g. the coating 64 may comprise evaporated aluminum or chromium. In such case, the remaining electrode, i.e. electrode 60, is suitably formed of silver or the like as hereinafter more fully described.

Electrode 58 is secured as a diaphragm across the top of disc-like plastic spacer means 66, the latter forming the body of the ionization chamber. The electrode 58 is held between spacer means 66 and metal ring 68 with ring 68 being positioned in a recess in case 40. Conductive coating 64 extends past insulating sheet 62 to contact metal ring 68, and therefore this coating is grounded to conductive case 40.

Lower electrode 60 comprises a metal layer 70 evaporated upon a conductive backing electrode means 72, the latter having an appreciably greater thickness. The principal purpose of backing electrode means 72, which is suitably formed of tantalum, tin, lead, or babbitt, is the blocking of the passage of X-radiation beyond this point in the ionization chamber to spacer means 66, since such X-radiation might result in misleading electric currents in the plastic. For example, the backing electrode means 72 may comprise .050 inch of tantalum or 0.125 inch of tin.

Electrode 60 is disc-shaped and is positioned centrally on a central hub portion of spacer means 66 thereby positioning layer 70 in close spaced relation with coating 64. For example, the spacing should be between 0.005 inch and 0.020 inch, with approximately 0.01 inch spacing being quite suitable. The close spacing is desired, as hereinafter more fully explained, so that photoelectrons produced at the chamber electrodes at higher X-ray beam energies will not produce disproportionately greater ionization in the chamber due to their more extended mean free path. Therefore the spacing desired is approximately less than the mean free path of such electrons, at the lowest beam energies utilized, with the minimum spacing tending to be limited by the mechanical tolerances of the construction.

The backing electrode means 72 resting upon the central hub portion of spacer means 66, is provided with a central stud 74 extending through a matching aperture in spacer means 66 and having a nut 76 threadably engaged therewith to secure the backing electrode means to the spacer means. This stud provides electrical connection via lead 78 to detection circuitry employed with the ionization chamber.

Layer 70 of electrode 60 is formed of a material having an X-ray absorption spectrum substantially corresponding to the photographic detector or film utilized as hereinafter more fully described. In one example, this layer comprises silver evaporated upon backing electrode means 72, the silver being of a thickness preventing return of photoelectrons from backing electrode means 72 through layer 70. Thus layer 70 is made at least as thick as the photoelectron range therethrough at the peak X-ray energy such that X-radiation reaching backing electrode means 72 will not introduce "foreign" electrons in the region betweeen electrodes 58 and 60. A thickness of ½ mil to 5 mils for layer 70 is sufficient for most purposes. For example, layer 70 may comprise ½ mil of evaporated silver or 5 mils of molybdenum.

The gas in region 80 between electrodes 58 and 60 is suitably air at atmospheric pressure, and therefore the spacer means 66 is provided with vents 82 communicating with a groove 84 between the central hub and the peripheral portion of chamber 44. Thus, the ionization chamber is substantially exposed to the atmosphere.

Preliminary consideration of the operation of the system including the ionization chamber will be made with the aid of FIG. 6. X-rays 86 from the X-ray tube pass through the object 30 being X-rayed to a greater or lesser extent and then through film 88 in film pack 28. Providing slide 46 is a rearward position, block 50 shields ionization chamber 44 from X-rays passing through the object and the film pack except for those X-rays incident upon aperture 52. Of course, when slide 46 removes block 50, then a greater number of X-rays reach ionization chamber 44 through aperture 42.

If the incident energy from the X-ray beam upon ionization chamber 44 is less than the binding energy which holds a particular photoelectron in place in the materials of electrode layers 64 and 70, such as an innermost or $k$ orbital electron, this electron will not be removed and few X-rays will be absorbed in the electrode layers. If the incident X-ray beam energy is somewhat more, so as to be more than the binding energy which holds such photoelectron in place, the incident X-ray photon is absorbed, and the photoelectron is ejected with an energy which is the difference between the energy of the ejected photoelectron. As the X-ray beam is absorbed, fairly large number of photoelectrons find their way to the electrode surface and traverse the air path in region 80 to a greater or lesser extent, causing ionization of the air. As a result of ionization, a current may be conducted between the electrodes 58 and 60, and such current is a measure of the ionization produced, and therefore of the X-ray exposure to which the ionization chamber is subjected. The film pack 28 is exposed to substantially the same beam, and therefore film exposure is also measured.

The ionization chamber is initially charged as a capacitor, e.g. by means of a source such as battery 90 connected between ground and lead 78 through a switch 92. After the ionization chamber is charged, switch 92 is opened, and the charge remains upon the electrodes of the ionization chamber. If the X-radiation is now initiated, as by energizing the X-ray tube, the ionization chamber gradually discharges as ions in region 80 conduct current between the chamber electrodes. The negative voltage on lead 94 with respect to ground gradually decreases and at any one time is a measure of the chamber's discharge and therefore of the exposure of X-radiation to which the chamber has been subjected. When this voltage reaches a predetermined level, the X-ray tube may be automatically deenergized, e.g., a particular voltage may be selected corresponding with the desired exposure of the film 88 in film pack 28, and circuitry may be made responsive to this voltage. The mechanism for the blackening of the film is similar to the mechanism for operation of the ionization chamber. Thus, the film blackening is in general proportion to the X-ray dose and therefore the state of charge of the ionization chamber will indicate the extent of exposure of the film.

In employing the FIG. 1 apparatus, object 30 to be X-rayed is placed upon film pack 28 and a spot light 126 secured on the end of pivot arm 128 is swung to a center position coincident with the center line 22 of the X-ray beam, stop 130 being used as a reference for arm 128. The spot light provides a beam which is directed upon object 30 to be X-rayed at approximately the point where the dose will be measured by the ionization chamber immediately thereunder. Therefore, dense, or less dense, portions of the object 30 may be selected by moving the object 30 around under the light 126 until the light illuminates the portion of the object 30 which is most crucial in determining proper exposure. Arm 128 is swung out of the way before the X-ray is taken, and is suitably engaged by door 32 so that arm 128 has to be moved out of the way before the door can be closed and the X-ray apparatus energized.

FIG. 7 illustrates more fully the circuitry employed with the ionization chamber. The circuitry within dashed lines indicates circuitry within case 40 adjacent the ionization chamber in the FIG. 1 apparatus. When door 32 on the cabinet 14 is closed, contacts 96 momentarily close to charge ionization chamber 44 to a negative voltage supplied via a voltage divider comprising potentiometer 98 and resistor 100, resistor 102 being interposed between the movable contact of potentiometer 98 and contacts 96. Lead 78 is also connected to the gate terminal of a metal oxide semiconductor field effect transistor 104 having its base and source terminals connected to ground via resistor 106. The drain terminal of field effect transistor 104 is connected to a negative supply via resistor 108 and potentiometer 110 in series, with potentiometer 110 being provided with an adjustable shunting tap. Likewise, the drain terminal of field effect transistor 104 is connected to the input of operational amplifier 112 via the series connection of potentiometer 114 and resistor 116 wherein potentiometer 114 is also provided with an adjustable shunting tap. Switching means 117 is employed to connect selectable feedback resistors 118 across the operational amplifier, and the output of operational amplifier 112 is coupled to gated threshold circuit 120 driving relay 122. Contacts 124 of relay 122 are connected in the supply of the X-ray tube so that when the voltage output of operational amplifier 112 drops below a predetermined or preset threshold level, contacts 124 drop out and disconnect the supply to the X-ray tube.

In the FIG. 7 circuit, potentiometer 114 is a gain adjusting control for light-dark control for film exposure, and potentiometer 110 is a zero-adjusting element in the circuit. Switching means 117 is used as a film selector in conjunction with the aforementioned slide 46 whereby the apparatus may be adjusted to drop out contacts 124 at a selected X-ray dose depending upon the type of film employed.

After the ionization gauge is charged, exposure to the X-ray beam discharged the same while the voltage thereacross is measured employing the field effect transistor, the latter presenting a very high input impedance to the ionization chamber whereby the detection means will not prematurely discharged the ionization chamber.

Contacts 96 are suitably operated from the closure of door 32 as by including a relay operating switch in the frame door of 32. Thus, after operation of the apparatus, the X-ray tube will be discontinued until such time as door 32 is opened and reclosed, and the operation of the X-ray tube may then be re-initiated from control panel 16 since only then will contacts 124 also be closed. In this manner double exposure of the film is prevented.

In accordance with the present invention, one or more of the electrode layers of the ionization chamber are formed of a material having an X-ray absorption spectrum corresponding to the X-ray absorption spectrum of at least a major component of the photographic detector or film. FIG. 8 plots relative sensitivity of a film against X-ray beam energy in kilo-electron-volts. This plot is typical of silver bromide emulsion film and in particular for Kodak dosimeter film, as illustrated in Kodak pamphlet No. P-31. The curve in full line is for exposure to a spectrum or range of incident X-rays including X-rays up to approximately 100 kilo-electron-volts as may be substantially simultaneously available from a typical X-ray tube operating at a voltage near 100 kilovolts. Filtering in the system, including filtering by the object being X-rayed, tends to cause sensitivity to drop off somewhat at lower beam energies as compared with higher beam energies. In general, however, the film responds over a fairly wide range of beam energies.

The dashed curve illustrates the relative sensitivity of the same film for a substantially monochromatic X-ray beam or a beam containing X-rays primarily of a given energy or narrow range of energies. The latter beam tends to result at the location of the film when the energy of an X-ray beam is lowered, since at lower beam energies and with longer exposure times, a narrower energy range penetrates the object being X-rayed, etc. As is seen from the dashed curve in FIG. 8, the response for the monochromatic beam is no longer relatively smooth, but there are more distinct discontinuities in the spectral response of the film. For example, the response includes an absorption edge discontinuity which is chracteristic of silver and another absorption edge discontinuity which is characteristic of bromine.

Again, if the incident photon energy from the X-ray beam is less than the binding energy which holds a particular photoelectron in place, e.g. in the film, such as the innermost or $k$ orbital electron, this electron will not be removed, and very few X-rays will be absorbed. As the energy of the beam is increased just over the so-called $k$ edge represented by the aforementioned binding energy, the incident photons have enough energy to be absorbed by the innermost electron, and the electron is ejected. The discontinuities for silver and bromine in the FIG. 8 plot represent the $k$ absorption edges for such materials. Just above such an absorption edge or photoelectric edge, the X-ray beam is absorbed most efficiently. In accordance with the present invention, one or more of the electrodes in the ionization chamber are formed from material having substantially the same response as the film including these absorption edges, and then, as the beam energy is varied to lower energy values and as a result becomes more monochromatic, the ionization chamber responds in a manner substantially identical to the film rather than providing an erroneous output not representative of the response of the film.

As will be understood by those skilled in the art, the utilization of lower energy, and hence more monochromatic, X-rays is desired particularly in industrial radiography so that radiographs of increased contrast can be produced. Therefore, in industrial radiography a lower beam energy is preferred, as well as longer exposure times, which may not be possible in medical radiography. Moreover, slower responding films provide better detail. Ionization chamber heretofore available, not having the desired characteristics matching the film, have resulted in erroneous exposure and inconsistent results, as when the beam energy was lowered to the vicinity of the absorption edge discontinuities. With the system according to the present invention, however, an exposure within and usually well within 25% of the desired or ideal exposure value is automatically achieved over a wide range of beam energies produced in X-ray tubes operating at voltages from 110 kilovolts peak or more down to approximately 15 kilovolts peak. As a result, high contrast, correctly exposed radiographs are consistently produced in an adjustable energy X-ray device.

Moreover, in the present system, the ionization chamber is desirably located on the opposite side of the photographic detector or film from the object being X-rayed. It will be appreciated that in employing the system according to the present invention, wherein the ionization chamber response corresponds with that of the photographic detector or film, the photographic detector or film tends to absorb beam energies at precisely the values wherein the ionization chamber should provide the greatest output. That is to say, the photographic detector or film tends to filter the beam energies to which it is most responsive, and when the film is placed in front of the ionization chamber, resultant hindrance to the detection of those energies results. However, it is found that when the ionization chamber electrode materials substantially match those of the film as herein set out, a high correlation between film response and chamber response nonetheless takes place, and proper automatic exposure of the photographic detector results.

If improper ionization chamber electrode materials were used so that response characteristics of these materials no longer matched that of the film, it can be seen that a highly erroneous output of the ionization chamber can result. Such chamber tends to produce higher outputs at beam energies not corresponding to energies near the film absorption edges, and this tendency is intensified as a result of filtering by the film, because the beam energies corresponding to values near the film absorption edges are attenuated. Without a proper selection of the ionization chamber electrode materials, proper automatic exposure of the photographic detector in a variable energy X-ray apparatus is nearly impossible, when such detector is placed in front of the ionization chamber. However, in accordance with the present invention, the photographic detector or film may be placed immediately adjacent to the object being X-rayed. As a result, blur in the image due to finite X-ray source size and secondary radiation scatter is materially reduced, thereby providing a clearer radiograph.

Materials preferred for incorporation in one or more of the ionization chamber electrodes, so that the response of the ionization chamber will match that of the film, comprise the same materials which constitute major elements of the film. For silver-bromide emulsion film, the ionization detector electrodes desirably includes silver and/or bromine. Therefore, one or both of the electrodes suitably includes a silver layer constituting the effective part of such electrode where it faces the opposite electrode. For example, layers 70 and/or 64 may suitably comprise evaporated silver. One of the electrodes, e.g. the remaining electrode, may then include or comprise a bromide material which is suitably coated with a thin overlayer of stannous oxide to which an electrode conductor can be connected. However, it is found that adequately close response may be achieved with silver alone, or with a metal having an atomic number between that of silver and bromine, for example, metals having an atomic number between 40 and 50, e.g. silver, molybdenum, zirconium, tin palladium or cadmium. It has been found experimentally that silver, molybdenum and zirconium are of particular value, in the case of silver bromide emulsion film, and provide an automatic exposure within or well within 25% of the ideal exposure value.

As hereinbefore stated, it is preferable that ionization chamber electrodes be closely spaced. With wide spacing of the electrodes, the photoelectrons produced in the ionization chamber tend to cause ionization in the chamber in accordance with the spacing that photoelectrons can traverse, e.g. between the electrodes. Thus, at higher beam energies, increased ionization tends to result, especially when the electrodes are spaced farther apart, resulting in distortion of the characteristic of the ionization chamber, which should match that of the film. This may explain in part why electrode materials having atomatic numbers slightly below that of silver are effective in matching the characteristics of silver bromide emulsion film. However, close spacing tends to appreciably reduce the distortion that would otherwise take place.

Further in accordance wit hthe operation of the system according to the present invention, it is understood that the beam energy selected may be varied in accordance with the object being X-rayed and the type and contrast of radiograph desired. For large and dense objects, of course, higher beam energies are necessary in order to produce penetration thereof, and the production of a radiograph within a reasonable period of time. In operation, the discharge or discharge rate of the ionization chamber is ascertained by appropriate metering devices, and the tube kilovoltage is set upon the control panel until the ionization chamber discharges at a desired rate to produce a radiograph within some predetermined time period. The tube kilovoltage is thus frequently adjusted before and during the exposure, and is in any case variable from low values of kilovoltage to relatively high values of kilovoltage. However, whether the beam energy is high or low, the correlation between the absorption spectrum of the ionization detector and that of the photographic deector reasonably assures correct exposure.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. An X-ray system for automatically exposing a photographic detector to provide a radiograph of an intervening object, comprising:

X-ray generation means, an ionization chamber located on the opposite side of the position of an object to be X-rayed from said X-ray generation means, said ionization chamber including a pair of electrodes at least one of which is positioned in the path of X-rays from said X-ray generation means, said one of said electrodes including a material having an X-ray absorption spectrum including an absorption edge discontinuity or discontuinities substantially corresponding to the X-ray absorption spectrum of at least a major component of said photographic detector, and means responsive to said ionization chamber for substantially discontinuing generation of X-rays when said ionization chamber has received a predetermined radiation dose.

2. The system according to claim 1 wherein said photographic detector comprises silver halide emulsion film and wherein said one of said electrodes includes an element having an atomic number between 40 and 50.

3. The system according to claim 1 wherein said photographic detector includes silver bromide emulsion and wherein said one of said electrodes includes an element having an atomic number between 35 and 50.

4. The system according to claim 1 wherein said photographic detector comprises silver halide film and wherein said one of said electrodes includes at least a layer of material exposed to said X-ray radiation selected from the group consisting of silver, molybdenum, zirconium, tin, palladium and cadmium.

5. The system according to claim 1 wherein one of said electrodes includes bromine.

6. The system according to claim 1 wherein said ionization chamber is positioned for disposition on the remote side of said photographic detector from said X-ray generation means.

7. The system according to claim 1 wherein the electrodes of said ionization chamber are substantially perpendicular to the path of X-radiation and spaced from one another, said path intersecting said electrodes, the electrode nearest the X-ray generation means comprising a planar insulating support carrying a thin film of conducting material thereon to form a conducting part of such electrode.

8. The system according to claim 7 further including insulating means separating said electrodes at the periphery thereof and provided with aperture means for exposing the spacing between said electrodes to the atmosphere, and backing means behind the electrode farthest from the X-ray generation means for substantially absorbing X-radiation passing through such farthest electrode.

9. The apparatus according to claim 1 wherein said X-ray generation means is adaptable to produce X-rays of selectable energies, and further including means for capacitively charging the ionization chamber, with ionization as the result of X-radiation thereof acting to discharge the same, and wherein said means for substantially discontinuing generation of X-rays includes a field effect transistor coupled to an electrode of said ionization chamber for providing high impedance detection of the state of such discharge.

10. The system according to claim 1 wherein said photographic detector includes photographic film, and further including support means for receiving said photographic detector with the object X-rayed located substantially immediately upon said photographic detector, said ionization chamber being supported by such support means on the remote side of said photographic detector from said X-ray generation means.

11. The apparatus according to claim 10 further including an apertured slide adjustably attached to said support means for selective positioning of an aperture thereof between said photographic detector and said ionization chamber.

12. The apparatus according to claim 10 further including a light source positionable in the path between said X-ray generation means and said ionization chamber for directing a beam of light upon the object being X-rayed substantially toward the position of said ionization chamber.

13. The system according to claim 8 wherein the electrode farthest from the X-ray generation means has a thickness sufficient for preventing the transmission of X-ray produced electrons from said backing means through such farthest electrode to the region between said electrodes.

14. The system according to claim 1 wherein the electrodes of said ionization chamber have a spacing between 0.005 inch and 0.020 inch.

15. The system according to claim 14 wherein said spacing is approximately 0.01 inch.

16. The method of automatically exposing a photographic detector to X-radiation to provide a radiograph of a given object comprising the steps of:

placing the object to be X-rayed and a photographic detector in that order between a source of X-radiation and an ionization chamber, capacitively charging said ionization chamber, energizing said source thus exposing said object and said photographic detector, ejecting electrons within said ionization chamber in response to X-radiation which has passed through said photographic detector, wherein the electrons are ejected in quantities substantially proportional at various beam energies to the X-ray absorption at corresponding energies in said photographic detector, thus discharging said chamber, detecting the discharge of said ionization chamber, and terminating said exposure when a predetermined discharge level of said chamber has been detected.

References Cited

UNITED STATES PATENTS

| | | | |
|---|---|---|---|
| 2,122,222 | 6/1938 | Vingerhoets | 313—93 |
| 2,679,609 | 5/1954 | Meloy | 313—93 |
| 2,796,527 | 6/1957 | Oosterkamp et al. | 250—95 |
| 2,929,000 | 3/1960 | Arrison | 250—95 |
| 2,953,702 | 9/1960 | Zieler | 250—95 |

RALPH G. NILSON, Primary Examiner

C. E. CHURCH, Assistant Examiner

U.S. Cl. X.R.

250—65

UNITED STATES PATENT OFFICE

CERTIFICATE OF CORRECTION

Patent No. 3,483,379          Dated Dec. 9, 1969

Inventor(s)        JOHN L. BREWSTER

It is certified that error appears in the above-identified patent and that said Letters Patent are hereby corrected as shown below:

Column 2, line 68, delete "an".

Column 6, between lines 2 and 3, insert --the incident X-ray photon and the binding energy of--; line 4, "number" should be --numbers--; line 34, "proportion" should be --proportional--.

Column 7, line 5, "of" should be --to--; line 18, "discharged" should be --discharges--; line 22, "discharged" should be --discharge--; line 25, "frame door of 32" should read --frame of door 32--; line 26, "discontinued" should rea --disconnected--.

Column 8, line 21, "chamber" should be --chambers--.

Column 9, line 3, "includes" should be --include--; line 32, "atomatic" should be --atomic--; line 37, "wit hthe" shou be --with the--; line 56, "deector" should be --detector--.

**SIGNED AND
SEALED
JUN 2 1970**

(SEAL)
Attest:

Edward M. Fletcher, Jr.
Attesting Officer

WILLIAM E. SCHUYLER, JR.
Commissioner of Patents